April 9, 1963

R. BINDER 3,084,772

AUTOMOTIVE CLUTCH CONTROL SYSTEM

Filed Aug. 1, 1960

INVENTOR.
RICHARD BINDER
BY
E. M. Squire
his attorney

April 9, 1963 R. BINDER 3,084,772
AUTOMOTIVE CLUTCH CONTROL SYSTEM
Filed Aug. 1, 1960 2 Sheets-Sheet 2
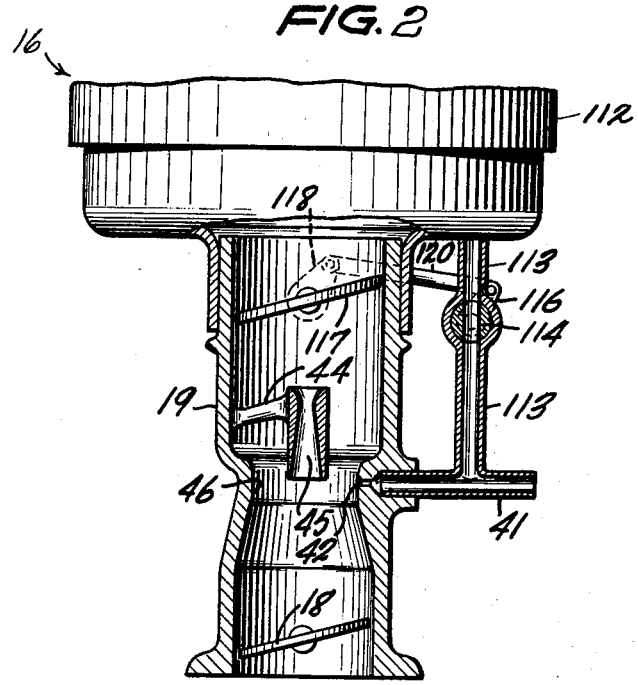
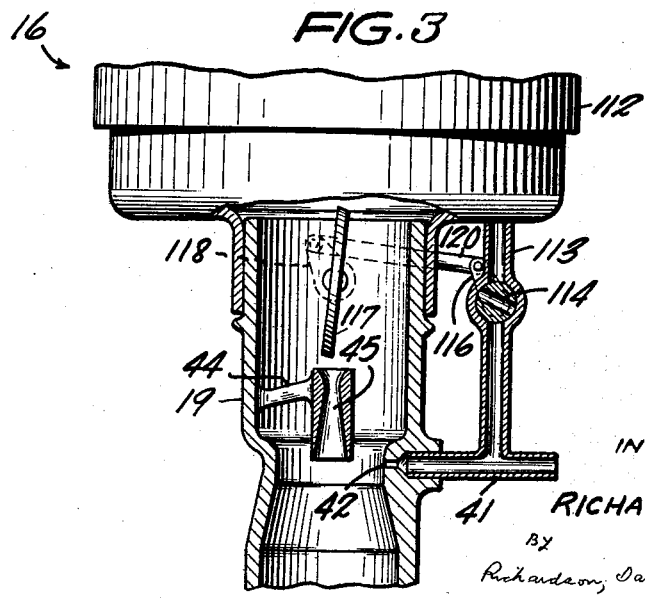
INVENTOR:
RICHARD BINDER
BY
Richardson, David and Nordon
ATTY'S

United States Patent Office 3,084,772
Patented Apr. 9, 1963

3,084,772
AUTOMOTIVE CLUTCH CONTROL SYSTEM
Richard Binder, Schweinfurt (Main), Germany, assignor to Fichtel & Sachs A.G., Schweinfurt (Main), Germany, a corporation of Germany
Filed Aug. 1, 1960, Ser. No. 46,745
Claims priority, application Germany Aug. 5, 1959
3 Claims. (Cl. 192—3.5)

The present invention relates to an improvement in automotive clutch control systems of the type wherein the clutch of an automotive vehicle is disengaged during gear shifting and reengaged at a controlled rate after gear shifting has been completed, the rate of reengagement being variable according to engine conditions so that both sudden jerks and undue slippage of the clutch are avoided.

More particularly, the present invention relates to an improvement in a clutch control system of the type disclosed in the application of Franz Joseph von Bomhard, Serial No. 791,482 filed on February 5, 1959, now Patent No. 2,974,765 issued on March 14, 1961 for an Automotive Clutch Control System and assigned to Fichtel & Sachs A. G. of Schweinfurt (Main), Federal Republic of Germany, the assignee of the instant application.

The use of the present invention in the system disclosed in Patent No. 2,974,765 prevents a jerky engagement of the clutch when using a carburetor provided with a choke for temporarily enriching the fuel mixture fed to the engine during the starting of the engine in a cold condition. In said Patent No. 2,974,765 no starting choke is disclosed.

When starting the engine with the choke in operation, there is a high vacuum present in the mixing chamber of the carburetor when the system would otherwise have substantially atmospheric pressure in the carburetor. The invention provides a valve which operates concurrently with the choke and places the line which leads from the carburetor to the remainder of the control system of Patent No. 2,974,765 in communication with the atmosphere during operation of the starting choke so that normal operation of the control system is not adversely affected by the presence of the choke.

Various objects, features and advantages of the invention will become apparent upon reading the following specification together with the accompanying drawings.

Referring to the drawings:

FIGURE 1 (which is the same as FIG. 1 of Patent No. 2,974,765) is a schematic diagram showing the general arrangement of a clutch control system embodying the invention.

FIGURE 2 is an enlarged fragmentary view in sectional elevation showing the arrangement of the air inlet pressure or suction connection at the upstream side of the butterfly valve of the carburetor, with the choke in operative condition.

FIGURE 3 is similar to FIG. 2 except that the choke is shown in inoperative condition.

Figure 1:
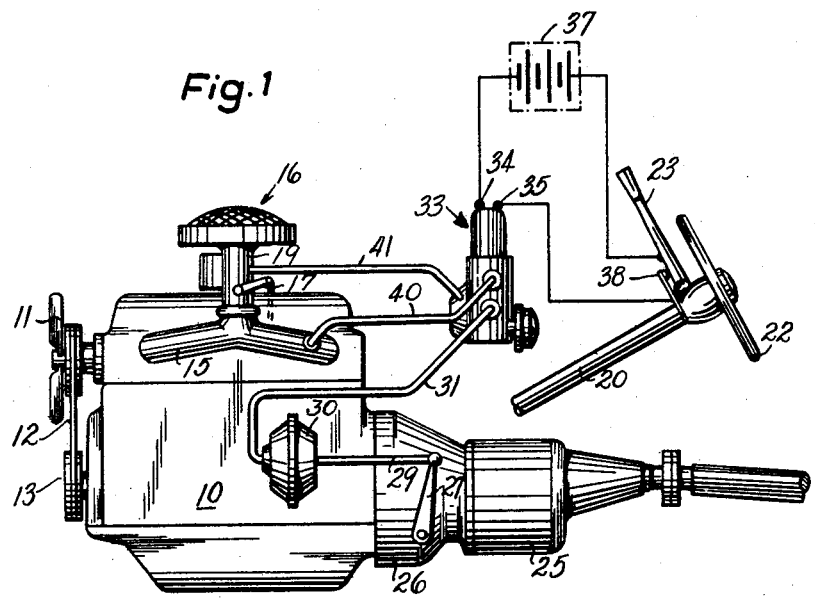

Referring to FIG. 1, there is shown the internal combustion engine 10 of an automotive vehicle. The engine 10 is provided with the usual cooling fan 11 driven by a fan belt 12 from a pulley 13 fixed to the crankshaft (not shown) of the engine 10. The engine 10 has an intake manifold 15 to which is connected a carburetor designated generally as 16. The carburetor 16 includes an accelerator lever 17 which is connected to the usual accelerator pedal (not shown). The accelerator lever 17 controls the position of a butterfly valve 18 (FIG. 2) disposed in the outlet duct 19 of the carburetor 16.

The vehicle is also provided with a steering column 20 upon which there is mounted a steering wheel 22 and a gear shift lever 23. The gear shift lever 23 may be manually displaced to select a desired one of a plurality of gear ratios within a transmission 25. The transmission 25 is connected to the engine 10 through a clutch 26. The clutch 26 is provided with a control lever 27 which, when rotated in a counterclockwise direction as viewed in FIG. 1, will always disengage the clutch 26 when it would otherwise be engaged. The clutch 26 may be of the self-engaging type such as a centrifugal clutch or it may be selectively disengaged at will by operation of a foot pedal. Similarly, it may be automatically engaged and disengaged by other means depending on engine speed or a combination of engine speed and vehicle speed conditions. Regardless of the particular form of construction of the clutch 26, it will always become disengaged when it would otherwise be engaged by movement of the clutch control lever 27 as described above. It will become reengaged progressively as the control lever 27 is rotated in a clockwise direction as viewed in FIG. 1. Sudden and complete clockwise movement of the control lever 27 will cause abrupt reengagement of the clutch 26 and this undesirable type of reengagement is prevented by the control system of the present invention in a manner later to be described.

The clutch control lever 27 is connected by a rod 29 to a vacuum-operated servomotor 30. The servomotor 30 is connected by a suction line 31 to a solenoid-actuated control valve designated generally as 33. The solenoid valve 33 is provided with an operating winding (not shown) which is connected to terminals 34 and 35. The energizing or control circuit for the solenoid valve 33 includes a battery 37 and normally opens contacts 38 mounted on the steering column 20 and actuated by the gear shift lever 23. Whenever the gear shift lever 23 is in an intermediate position of transit between two operating positions so that no gear ratio is effective in the transmission 25, the contacts 38 are closed. In all operating positions of the gear shift lever 23, the contacts 38 are open. The contacts 38 are also open whenever the gear shift lever 23 is in its neutral position since there is then no need to disengage the clutch 26.

With the contacts 38 closed, the servomotor suction line 31 is connected to a main suction line 40 which leads directly to the intake manifold 15. This causes operation of the servomotor 30 to produce immediate and complete disengagement of the clutch 26. When the contacts 38 open, the solenoid valve connects the servomotor 30 with the atmosphere, at first substantially directly, so that an immediate partial reengagement of the clutch 26 is obtained. Thereafter flow-restricting devices delay the restoration of full atmospheric pressure in the servomotor 30 so that full reengagement of the clutch 26 takes place smoothly and progressively.

Referring to FIGS. 1, 2 and 3, 112 designates the air filter for the carburetor 16. The air filter 112 is mounted on top of the air inlet duct 19 of the carburetor 16. There is an auxiliary suction line 41 which leads to the solenoid-actuated control valve 33 and communicates with the throat 46 of the duct 19 through a metering orifice 42. The arm 44 supports a diffusing member 45 just above the throat 46.

There is a branch line 113 which leads from the auxiliary suction line 41 to the air filter 112. Inserted in the branch line 113 and interposed between the auxiliary suction line 41 and the air filter 112 there is a rotary valve member 114. The position of the rotary valve member 114 is controlled by an arm 116. Disposed above the diffusing member 45 is a choke butterfly valve 117 the position of which is controlled by conventional means (not shown) so that it will be closed when required during starting of the engine with the engine in a cold condition. The arm 118 of choke butterfly valve 117 is connected by a link member 120 with the arm 116 of the rotary valve 114 in such a manner that when one valve is closed the other will be open and vice versa.

When the engine is operating at low speed, a very gradual engagement of the clutch is desired. With the choke butterfly valve open, as shown in FIG. 3, and with the throttle valve 18 only slightly open, the auxiliary suction line 41 is at substantially atmospheric pressure and the rate of clutch engagement is at a minimum. However, closure of the choke butterfly valve 117 will create a condition of high vacuum at metering orifice 42 which would greatly increase the rate of clutch engagement. Rapid clutch engagement is appropriate only for high engine speeds. Rapid clutch engagement at low engine speeds produces undesirable jerkiness. By opening the rotary valve 114 when the choke butterfly valve 117 is closed, the auxiliary suction line 41 is placed in communication with the atmosphere through the air filter 112. This maintains atmospheric pressure in the auxiliary suction line 41, and thus a slow rate of clutch engagement during starting conditions. Because the auxiliary suction line 41 communicates with the throat 46 of the carburetor through the metering orifice 42, only a slight amount of additional air is introduced into the air-fuel mixture and thus there is no appreciable interference with the desired enrichment which accompanies closure of the choke butterfly valve 117.

While I have shown what I believe to be the best embodiment of my invention, it will be apparent that various modifications may be made therein without departing from the spirit and scope of the invention as defined in the appended claims.

What is claimed is:

1. An automotive clutch control system comprising suction actuable servomotor means connected for disengaging said clutch when it would otherwise be engaged; an internal combustion engine in driving connection with said clutch, said engine including an intake manifold for delivering an air-fuel mixture to said engine; a carburetor having an outlet duct connected to said intake manifold for supplying said air-fuel mixture thereto, said outlet duct having throttle-actuated control valve disposed therein and a constricted throat portion in said outlet duct located upstream of said control valve, said throat portion having a first metering orifice formed therein; a transmission driven by said engine through said clutch; gear shifting means for selecting a desired gear ratio within said transmission; a solenoid valve having a suction chamber, a servomotor chamber and an atmospheric pressure chamber; an energizing circuit for said solenoid valve, said energizing circuit including switch means actuated by said gear shifting means for energizing said circuit during the changing of gear ratios in said transmission; a first suction line connecting said suction chamber to said intake manifold; a second suction line connecting said servomotor chamber to said servomotor means; means defining a second metering orifice through which said atmospheric pressure communicates with the atmosphere; a valve member actuable upon energization of said energizing circuit which transfers said servomotor chamber from communication with said atmospheric pressure chamber into communication with said suction chamber, said valve member restoring the original communications among said chambers immediately upon deenergization of said energizing circuit; a pressure regulating valve by-passing said second metering orifice; pressure responsive means connected to said first metering orifice through an auxiliary suction line, said pressure responsive means reducing the pressure differential required for operation of said pressure regulating valve in response to an increase in the flow rate of air-fuel mixture through said carburetor throat portion, said pressure regulating valve permitting a partial restoration of atmospheric pressure in said atmospheric pressure chamber in accordance with said pressure differential immediately upon deenergization of said energizing circuit followed by full restoration of atmospheric pressure at a rate determined by said second metering orifice; a choke valve in said carburetor located upstream of said throat portion; a branch line connecting said auxiliary suction line with the atmosphere; a shut-off valve in said branch line; and means interconnecting said choke valve and said shut-off valve whereby when one valve is open the other is closed and vice versa.

2. A clutch control system according to claim 1, in which said carburetor further comprises an air filter and wherein said branch line communicates with the atmosphere through said air filter.

3. A clutch control system according to claim 1, wherein said branch line is connected to said auxiliary suction line adjacent to said first metering orifice.

References Cited in the file of this patent

UNITED STATES PATENTS

| Re. 23,901 | Randol | Nov. 30, 1954 |
| 913,121 | Frayer | Feb. 23, 1909 |
| 2,612,973 | Janowski | Oct. 7, 1952 |
| 2,974,765 | Von Bomhard | Mar. 14, 1961 |